(12) United States Patent
Balogh et al.

(10) Patent No.: US 9,207,727 B2
(45) Date of Patent: Dec. 8, 2015

(54) DETERMINING AIR FILTER REPLACEMENT CONDITIONS USING AIR FLOW AND ENERGY CONSUMPTION VALUES

(71) Applicant: International Business Machines Corporation, Armonk, NY (US)

(72) Inventors: Nicholas J. Balogh, Raleigh, NC (US); Gordon B. Grout, Rochester, MN (US); Kobina K. Inkumsah, Lansing, MI (US); Robert H. Johnson, Jr., Research Triangle Park, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 150 days.

(21) Appl. No.: 14/187,636

(22) Filed: Feb. 24, 2014

(65) Prior Publication Data

US 2015/0241934 A1    Aug. 27, 2015

(51) Int. Cl.
*G08B 21/00*     (2006.01)
*G06F 1/20*      (2006.01)
*G01P 5/06*      (2006.01)

(52) U.S. Cl.
CPC .... *G06F 1/20* (2013.01); *G01P 5/06* (2013.01)

(58) Field of Classification Search
CPC .................................................. B01D 46/0086
USPC ...................... 340/607, 608; 700/301; 702/47
See application file for complete search history.

(56) References Cited

U.S. PATENT DOCUMENTS

| | | | |
|---|---|---|---|
| 5,668,535 A | 9/1997 | Hendrix et al. | |
| 6,107,923 A | 8/2000 | Christol | |
| 6,241,603 B1 | 6/2001 | Watson | |
| 6,423,118 B1 | 7/2002 | Becerra et al. | |
| 6,448,896 B1 | 9/2002 | Bankus et al. | |
| 7,178,410 B2 | 2/2007 | Fraden et al. | |
| 7,194,340 B2 | 3/2007 | Honma | |
| 7,640,077 B2 | 12/2009 | Shah | |
| 7,751,990 B2 | 7/2010 | Kerrigan et al. | |
| 2006/0100796 A1 | 5/2006 | Fraden et al. | |
| 2007/0251381 A1 | 11/2007 | Latham et al. | |
| 2012/0323377 A1 | 12/2012 | Hoglund et al. | |

FOREIGN PATENT DOCUMENTS

| | | |
|---|---|---|
| EP | 0778066 B1 | 11/2002 |
| JP | 08257332 A | 10/1996 |
| JP | 2000153121 A | 6/2000 |
| JP | 2000171385 A | 6/2000 |
| WO | 03/014838 A2 | 2/2003 |
| WO | 2005/110580 A2 | 11/2005 |
| WO | 2010027355 A1 | 3/2010 |

*Primary Examiner* — Jeffery Hofsass
(74) *Attorney, Agent, or Firm* — Katherine S. Brown; Jeffrey L. Streets (57) ABSTRACT

A method of determining a condition of a filter located within a system is provided. The method may include determining a first air flow measurement value for a first air flow through the filter, determining a first energy consumption value associated with generating the first air flow through the filter, determining a first ratio between the first air flow measurement value and the first energy consumption value, determining a second air flow measurement value for a second air flow through the filter, determining a second energy consumption value associated with generating the second air flow through the filter, and determining a second ratio between the second air flow measurement value and the second energy consumption value. The filter may then be replaced based on a comparison between the determined first and the determined second ratio.

20 Claims, 4 Drawing Sheets

DETERMINING AIR FILTER REPLACEMENT CONDITIONS USING AIR FLOW AND ENERGY CONSUMPTION VALUES

BACKGROUND a. Field of the Invention

The present invention generally relates to evaluating system integrity, and more particularly, to determining when to replace a system's filter.

b. Background of Invention

Dust and debris may collect on the face of a device or system such as, for example, a computer server. Thus, air flow through the chassis of a system such as the computer server may become impeded. This reduced air flow in turn may lead to more power being consumed cooling the system. For example, the speed or frequency of operation of the cooling fan may be increased to compensate for the drop in an air flow and subsequent temperature increase associated with the system.

More specifically, dust and debris may accumulate on one or more filters within the chassis of the system, causing air flow through these filters to become impeded. Thus, additional power is consumed to cool the system. Filters may, however, often be changed based on timing (e.g., monthly, bi-annually, etc.) and the environmental conditions (e.g., high or low debris within the air) under which the system is operating.

BRIEF SUMMARY

Therefore, according to one or more exemplary embodiments, a filter change may be determined based on both air flow and energy consumption measurements.

According to one exemplary embodiment, a method of determining a condition of a filter located within a system is provided. The method may include determining a first air flow measurement value for a first air flow through the filter, determining a first energy consumption value associated with generating the first air flow through the filter, determining a first ratio between the first air flow measurement value and the first energy consumption value, determining a second air flow measurement value for a second air flow through the filter, determining a second energy consumption value associated with generating the second air flow through the filter, and determining a second ratio between the second air flow measurement value and the second energy consumption value. The filter may then be replaced based on a comparison between the determined first and the determined second ratio.

According to another exemplary embodiment, a computer system for determining a condition of a filter located within a system is provided. The computer system may include one or more processors, one or more computer-readable memories, one or more computer-readable tangible storage devices, and program instructions stored on at least one of the one or more storage devices for execution by at least one of the one or more processors via at least one of the one or more memories. The computer system is capable of performing a method that may include determining a first air flow measurement value for a first air flow through the filter, determining a first energy consumption value associated with generating the first air flow through the filter, determining a first ratio between the first air flow measurement value and the first energy consumption value, determining a second air flow measurement value for a second air flow through the filter, determining a second energy consumption value associated with generating the second air flow through the filter, and determining a second ratio between the second air flow measurement value and the second energy consumption value. The filter may then be replaced based on a comparison between the determined first and the determined second ratio.

According to yet another exemplary embodiment, a computer program product for determining a condition of a filter located within a system is provided, whereby the computer program product includes one or more tangible computer-readable storage devices and program instructions stored on at least one of the one or more tangible storage devices. The program instructions, executable by a processor, may include determining a first air flow measurement value for a first air flow through the filter, determining a first energy consumption value associated with generating the first air flow through the filter, determining a first ratio between the first air flow measurement value and the first energy consumption value, determining a second air flow measurement value for a second air flow through the filter, determining a second energy consumption value associated with generating the second air flow through the filter, and determining a second ratio between the second air flow measurement value and the second energy consumption value. The filter may then be replaced based on a comparison between the determined first and the determined second ratio.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
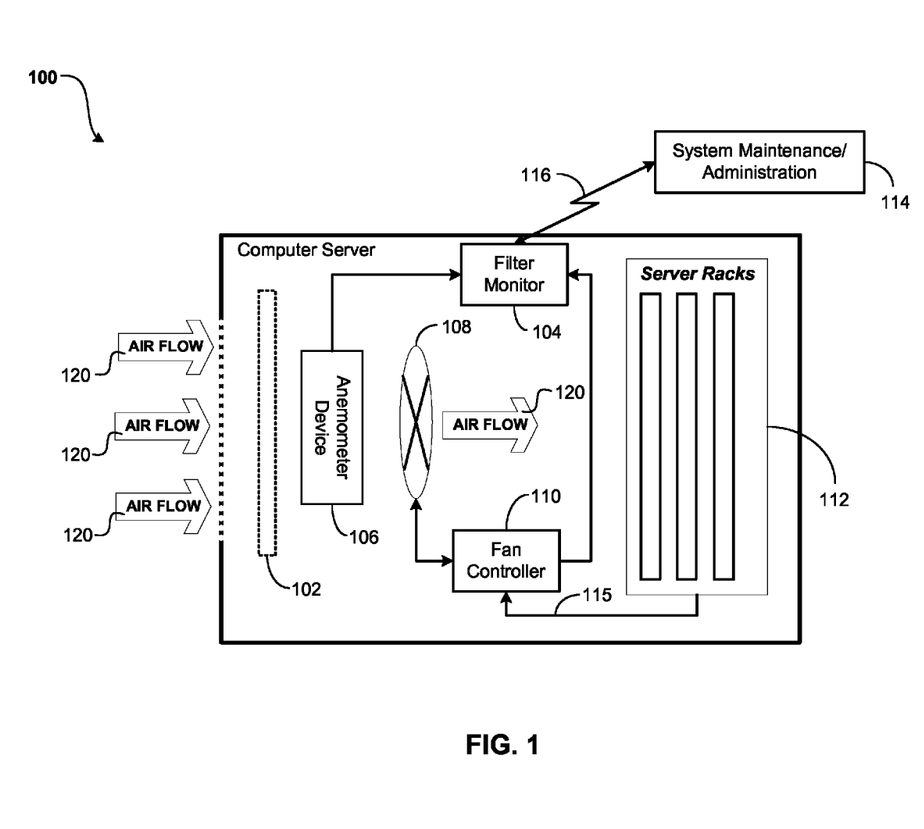
FIG. 1 depicts a block diagram of an exemplary server system that incorporates filter condition determination according to one embodiment.

FIG. 1 depicts a block diagram of an exemplary server system 100 that incorporates filter condition determination according to one embodiment. The server system 100 may include, among other things, an air filter 102, an air flow speed measurement device such as an anemometer 106, a filter monitor 104, a fan 108, a fan controller 110, and a server rack 112 that includes the computational and storage elements of the server system 100. Also, as depicted, the air flow monitor many be in communication with a system maintenance or system administration center 114 over a communication link 116.

In operation, under the control of the fan controller 110, rotating fan 108 creates an air flow, as indicated by arrows 120. The air flow generated by fan 108 passes through the filter 102 prior to convectionally providing cooling to the server rack 112. As such, particles and debris in the air flow are removed by the filter in order to mitigate the build up of dust and debris within the server rack. According to at least one exemplary embodiment, the air flow speed measurement device such as anemometer 106 is used in conjunction with the filter monitor 104 to process the air flow speed in a manner that allows the determination when air filter 102 needs to be replaced. As such, the anemometer 106 detects changes in air flow speed at the rear side of the filter 102 as air exits. Once the filter monitor 104 receives the detected air flow speed from the anemometer 106, the filter monitor 104 then processes the received air flow speed measurement, along with the fan's power consumption, for ascertaining whether the filter requires replacement. This processing carried out by the filter monitor 104 is further described below in relation to the flow charts depicted in FIGS. 2A and 2B.

Figure 2A:
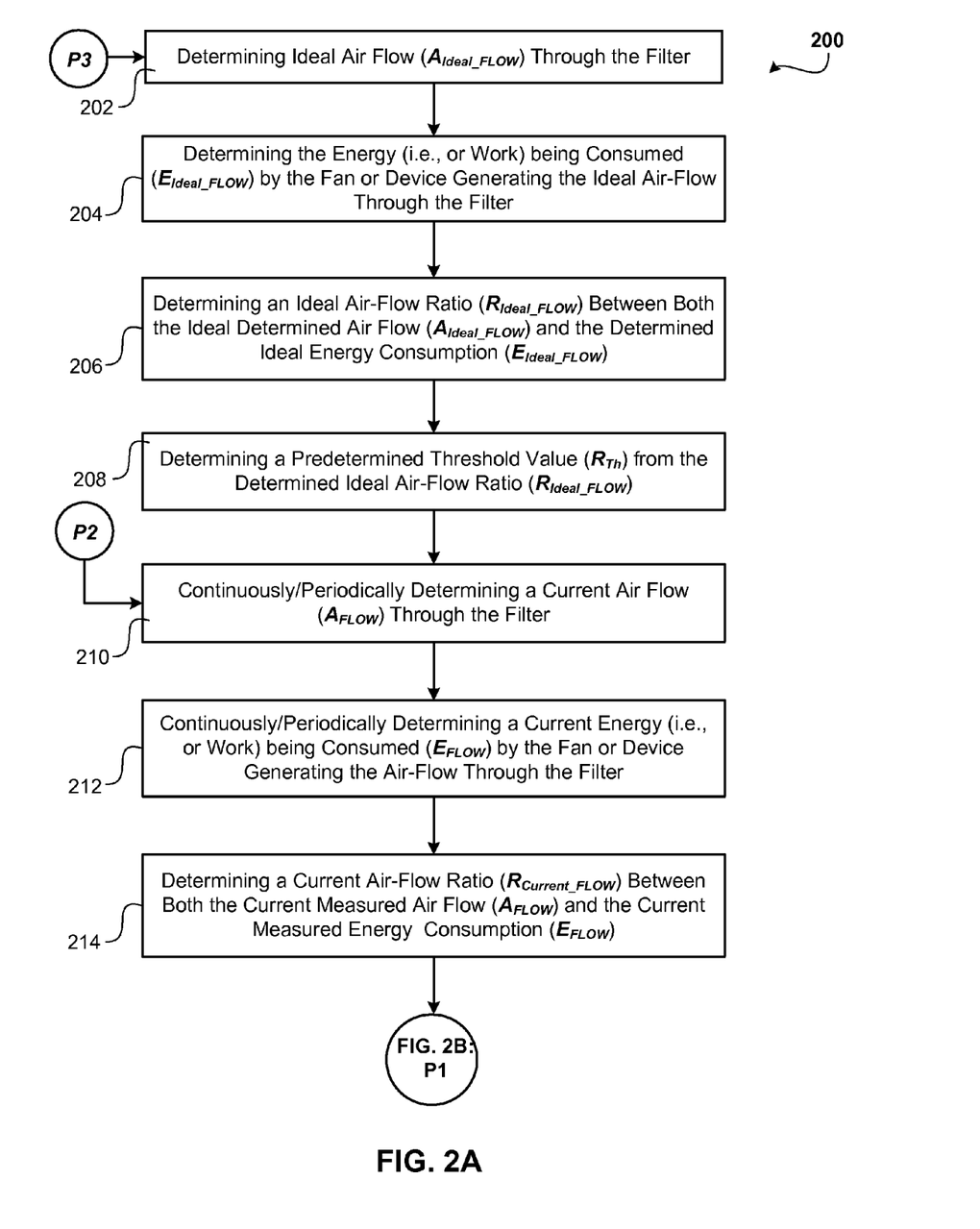
FIGS. 2A and 2B are operational flowcharts that depict an exemplary filter condition determination process according to one embodiment.
Figure 2B:
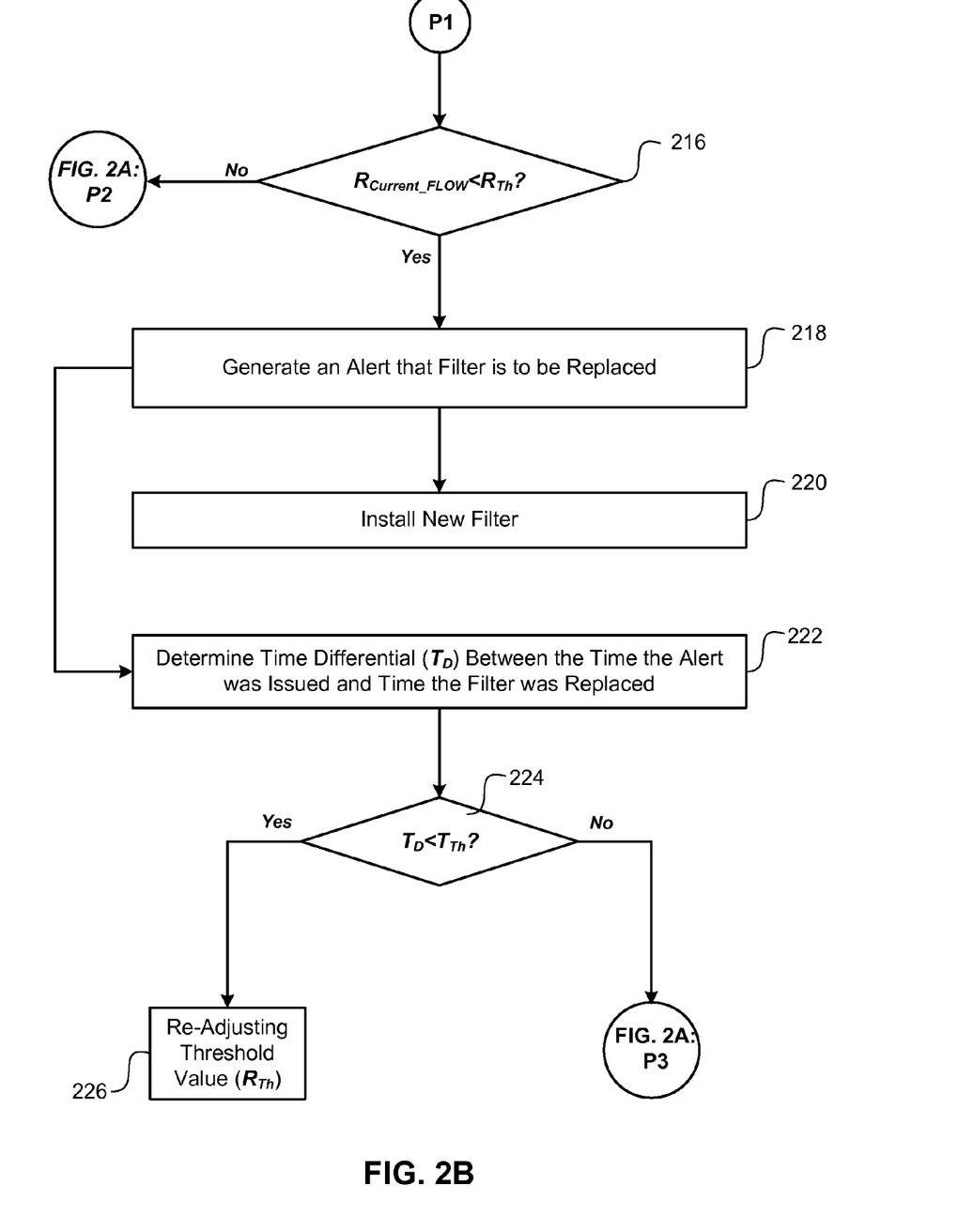

FIGS. 2A and 2B depict an operational flowchart 200 of an exemplary filter condition determination process (i.e., Filter Condition Determination (FCD) program) according to one embodiment. FIGS. 2A and 2B are described with the aid of FIG. 1. As previously indicated, the exemplary filter condition determination process may be, for example, implemented within filter monitor 104.

Referring to FIG. 2A, at 202, the ideal or optimal air flow speed ($A_{Ideal\_FLOW}$) through the filter 102 (FIG. 1) is determined by the anemometer 106 and sent to the filter monitor 104 for processing. The ideal or optimal air flow speed may be determined based on measuring the air flow speed through the filter 102 when the filter is new and just placed in the server system, or shortly thereafter. A newly replaced filter ensures no clogging of the filter with debris.

At 204, the energy ($E_{Ideal\_FLOW}$) being consumed by the fan 108 (FIG. 1) or any other device while generating the optimal air flow through the filter 102 (FIG. 1) is determined. For example, in some implementations, the revolutions-per-minute (RPM) of the fan may be recorded by the fan controller 110 and then sent to the filter monitor 104 (FIG. 1) for processing. Thus, the RPM measurement may be representative of the fans consumed energy, whereby an increased RPM may be indicative of a higher consumed energy and a decreased RPM may be related to a lower consumed energy. For example, in other implementations, the fan controller 110 may provide an indication of the fan's consumed energy by measuring the electrical current drawn by the fan 108 at a particular fan speed.

At 206, an ideal or optimal air-flow-ratio ($R_{Ideal\_Flow}$) is determined by the filter monitor 104 using both the determined optimal air flow speed ($A_{Ideal\_FLOW}$) through the filter 104 (FIG. 1) and the energy ($E_{Ideal\_FLOW}$) being consumed by the fan 108 (FIG. 1) when generating the optimal air flow speed through the filter 104. For example, the ideal or optimal air-flow-ratio ($R_{Ideal\_Flow}$) may be given by:

$$R_{Ideal\_FLOW} = \frac{A_{Ideal\_FLOW}}{E_{Ideal\_FLOW}} \quad \text{Equation (1)}$$

At 208, a predetermined threshold ($R_{Th}$) is determined by the filter monitor 104 (FIG. 1) from the ideal or optimal air-flow-ratio ($R_{Ideal\_Flow}$). Thus, at the filter monitor 104, the predetermined threshold ($R_{Th}$) is calculated by multiplying or weighting the optimal air-flow-ratio ($R_{Ideal\_Flow}$) by a factor ($f_c$). For example, the predetermined threshold ($R_{Th}$) may be set to 50% (i.e., factor $f_c$=0.5) of the determined optimal air-flow-ratio ($R_{Ideal\_Flow}$) Generally, the predetermined threshold ($R_{Th}$) may be given by:

$$R_{th} = f_c \times R_{Ideal\_FLOW} = f \times_c \frac{A_{Ideal\_FLOW}}{E_{Ideal\_FLOW}} \quad \text{Equation (2)}$$

At step 210, the current or present air flow speed ($A_{FLOW}$) through filter 102 (FIG. 1) is continuously or periodically (e.g., every 5 seconds) determined by the anemometer 106 (FIG. 1) and sent to the filter monitor 104 (FIG. 1) for processing. At 212, the current or present energy ($E_{FLOW}$) being consumed by the fan 108 (FIG. 1) or any other device while generating the optimal air flow through the filter 102 (FIG. 1) is received by the filter monitor 104. For example, in some implementations, the revolutions-per-minute (RPM) of the fan may be recorded by the fan controller 110 and then sent to the filter monitor 104 (FIG. 1) for processing. As previously described, the RPM measurement may be representative of the fans consumed energy, whereby an increased RPM may be indicative of a higher consumed energy and a decreased RPM may be related to a lower consumed energy. For example, in other implementations, the fan controller 110 may provide an indication of the fan's consumed energy by measuring the electrical current drawn by the fan 108 at a particular fan speed.

At 214, the current or present air-flow-ratio ($R_{Current\_Flow}$) is determined by the filter monitor 104 using both the current or present air flow speed ($A_{FLOW}$) through the filter 104 (FIG. 1) and the present or current energy ($E_{FLOW}$) being consumed by the fan 108 (FIG. 1) when generating the current or present air flow speed through the filter 104. For example, the current or present air-flow-ratio ($R_{Current\_Flow}$) may be given by:

$$R_{Current\_FLOW} = \frac{A_{FLOW}}{E_{FLOW}} \quad \text{Equation (3)}$$

According to the one or more embodiments described herein, the present or current air flow speed and energy consumption determinations may be measurements taken in real-time or pseudo real time in order to reflect the most up-to-date status associated with the air flow through the filter 102 (FIG. 1) and, therefore, the filter's 102 condition.

Referring now to FIG. 2B, at 216, the filter monitor 104 (FIG. 1) may determine whether the current or present air-flow-ratio ($R_{current\_Flow}$) value has dropped below the predetermined threshold ($R_{Th}$) value. Referring to Equation 3, as the filter becomes more clogged with use, the fan's 102 (FIG. 1) energy consumption increase may be reflect by a higher current or present energy ($E_{FLOW}$) value. Thus, as the $E_{FLOW}$ value increases, the current or present air-flow-ratio ($R_{Current\_Flow}$) continues to drop. If the current or present air-flow-ratio ($R_{Current\_Flow}$) value remains above the threshold ($R_{Th}$) value, the process returns to 210 (FIG. 2A). If, however, the current or present air-flow-ratio ($R_{current\_Flow}$) value drops below the threshold ($R_{Th}$) value as a result of the fan's 102 RPM increase and, therefore, the $E_{FLOW}$ value increase, at 218 an alert may subsequently be generated by the filter monitor 104.

For example, as the filter 102 (FIG. 1) becomes more clogged with debris, the server rack 112 (FIG. 1) may dissipate more heat. This increased heat in the server may then be detected and fed back to the fan controller 110 (FIG. 1) as a sensor feedback input 115 (FIG. 1). The fan controller 110 may therefore increase the RPM speed of the fan 102 to compensate for the increase in heat dissipation in the rack that has occurred as a result of the impeded air flow thought the filter 102. The fan controller may send the increased RPM value to the filter monitor 104 as a measure of current or present energy ($E_{FLOW}$) value. Prior to the compensatory increase in the fan speed, the current or present air flow speed ($A_{FLOW}$) through filter 102 (FIG. 1) is determined and also sent by the anemometer device 106 (FIG. 1) to the filter monitor 104. The current or present air flow speed ($A_{FLOW}$) through filter 102 (FIG. 1) is thus reduced due to the debris clogging the filter. Moreover, the value associated with the current or present energy ($E_{FLOW}$) consumption has increased as a result of the compensatory RPM increase. The current or present air-flow-ratio ($R_{Current\_Flow}$) value then reduces based on the reduction in the numerator (i.e., $A_{FLOW}$) of Equation (3) and an increase in the denominator (i.e., $E_{FLOW}$) of Equation (3).

According to another process implementation, at 216, the value associated with the current or present energy ($E_{FLOW}$) consumption increases as a result of the compensatory RPM increase required for maintaining substantially the same air flow speed through the filter 102 as when the filter 102 was first installed. Here, the current or present air flow speed ($A_{FLOW}$) through the filter 102 (FIG. 1) remains substantially constant as the current or present energy ($E_{FLOW}$) consumption increases as a result of the compensatory RPM increase required to maintain the same air flow through the aging filter. The current or present air-flow-ratio ($R_{Current\_Flow}$) value then reduces based on the numerator (i.e., $A_{FLOW}$) of Equation (3) remaining constant and the denominator (i.e., $E_{FLOW}$) of Equation (3) increasing.

Once the current or present air-flow-ratio ($R_{Current\_Flow}$) value has dropped below the predetermined threshold ($R_{Th}$) value, at 218, the alert generated by the filter monitor 104 (FIG. 1) may be sent over the communication link 116 (FIG. 1) to the system maintenance or system administration center 114 (FIG. 1). Once this alert is received by the system maintenance or system administration center 114, at 220 a new filter may be installed in place of the currently installed used filter.

At 222, a time differential or difference ($T_D$) between the time the alert was issued and the time the previous filter 102 (FIG. 1) now being replaced was installed is determined by the filter monitor 104 (FIG. 1). This measurement is carried out in order to determine whether the predetermined threshold ($R_{Th}$) is set to be too sensitive. Thus, a threshold time ($T_{Th}$) associated with the time difference between time the alert was issued and the time the previous filter 102 (FIG. 1) now being replaced was installed is set by the filter monitor 104.

According to another implementation, the predetermined threshold value ($R_{Th}$) may be adjusted based on the time difference ($T_D$) being calculated (e.g., by filter monitor 104: FIG. 1) as the difference between the time of determining of the first ratio at 206 and the time when the second ratio falls below the first ratio at 216.

At 224, it is determined whether the time differential or difference ($T_D$) between the time the alert was issued and the time the previous filter 102 (FIG. 1) now being replaced was installed is less than a threshold time ($T_{Th}$). If the time differential or difference ($T_D$) is indeed less than the threshold time ($T_{Th}$), at 226 the predetermined threshold ($R_{Th}$) is re-adjusted to a lower value which may trigger at a lower ratio value. If the time differential or difference ($T_D$) is not less than the threshold time ($T_{Th}$), the process returns to 202 (FIG. 2A) and no re-adjustment of the predetermined threshold ($R_{Th}$) is necessary.

In some implementations, the predetermined threshold ($R_{Th}$) may be re-adjusted by the filter monitor 104 (FIG. 1). For example, the filter monitor 104 may re-adjust the predetermined threshold ($R_{Th}$) by reducing factor $f_c$. A reduction of factor $f_c$ may in turn reduce the predetermined threshold ($R_{Th}$), as indicated by Equation (2).

For example, the threshold time ($T_{Th}$) may be set to 2-months. If the time difference ($T_D$) between the time the alert was issued and the time the previous filter 102 (FIG. 1) now being replaced was installed is determined to be 1-month, the predetermined threshold ($R_{Th}$) is re-adjusted to be less sensitive such that time difference $T_D$ approaches at least the threshold time $T_{Th}$. If the predetermined threshold ($R_{Th}$) is too sensitive, filter replacement costs may needlessly increase as result of this threshold ($R_{Th}$) being breached too soon. This evaluation process (222-226) may, however, also serve as a means for reevaluating the air quality where the server 100 (FIG. 1) is housed or located. For example, if the air quality being pulled in by the fan 102 (FIG. 1) is compromised (e.g., polluted), the alert time may suddenly occur sooner and provide an indication of such an event. In this scenario, a re-adjusting of the predetermined threshold ($R_{Th}$) may not be necessary upon discovery and elimination of a pollutant source in the environment surrounding the server 100.

The one or more above-described embodiments may be implemented using any sensor, transducer, and/or processing device capable of converting air flow to an air flow measurement value such as air flow speed. The one or more above-described embodiments may also be implemented using any sensor, transducer, and/or processing device capable of converting power or energy consumed by a cooling device such as a fan to an energy consumption value such as the fan's RPM during operation. The energy consumption value may, therefore, be any value that is indicative of consumed energy, while the air flow measurement value may be any value that is indicative of air flow speed.

Figure 3:
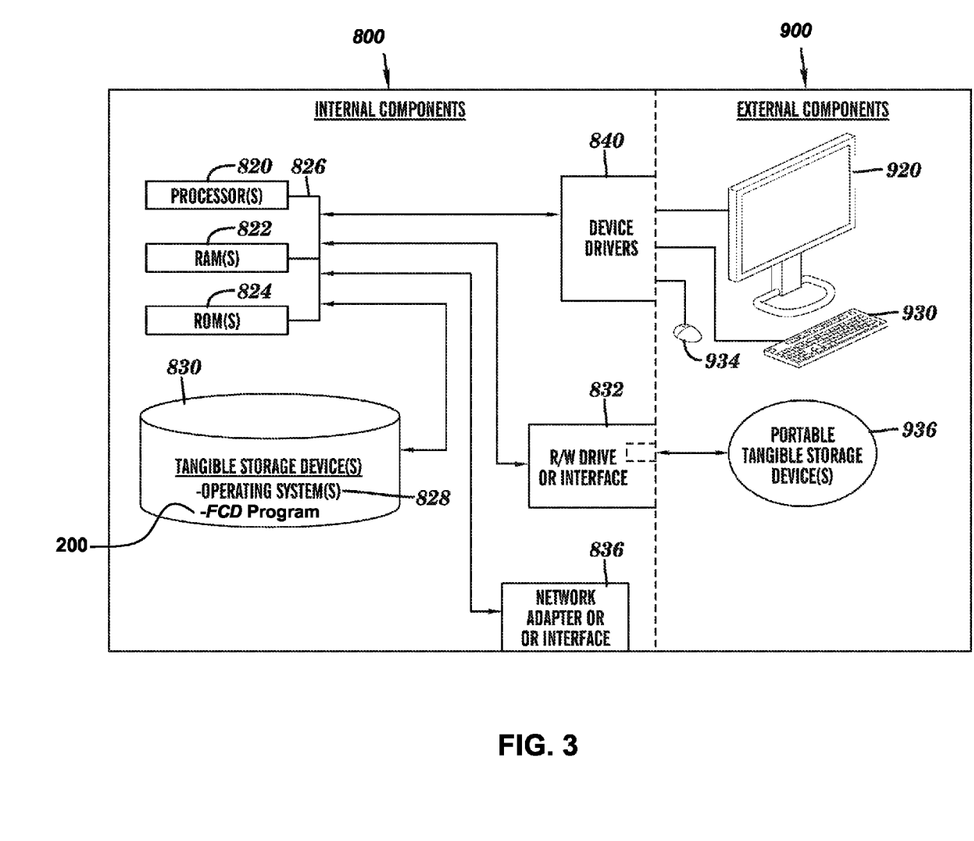
FIG. 3 is a block diagram of hardware and software for executing the process flows of FIGS. 2A and 2B according to one embodiment.

FIG. 3 shows a block diagram of the components of a data processing system 800, 900, such as, for example, filter monitor 104 (FIG. 1) in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Filter monitor 104 (FIG. 1) may include internal component 800 and external component 900 illustrated in FIG. 3. The internal component 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the filter condition determination (FCD) program 200 (FIGS. 2A-2B) corresponding to filter monitor 104 (FIG. 1) is stored on one or more computer-readable tangible storage devices 830 for execution by one or more processors 820 via one or more RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal component 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The FCD program 200 (FIGS. 2A-2B) associated with filter monitor 104 (FIG. 1) can be stored on one or more of the respective portable computer-readable tangible storage devices 936, read via the respective R/W drive or interface 832 and loaded into the respective hard drive 830.

Internal component 800 may also include network adapters (or switch port cards) or interfaces 836 such as a TCP/IP adapter cards, wireless wi-fi interface cards, or 3G or 4G wireless interface cards or other wired or wireless communication links. The FCD program 200 (FIGS. 2A-2B) can be downloaded to the filter monitor 104 (FIG. 1) from an external computer (e.g., server) via a network (for example, the Internet, a local area network or other, wide area network) and respective network adapters or interfaces 836. From the network adapters (or switch port adaptors) or interfaces 836, the FCD program 200 (FIGS. 2A-2B) associated with filter monitor 104 (FIG. 1) is loaded into the respective hard drive 830. The network may comprise copper wires, optical fibers, wireless transmission, routers, firewalls, switches, gateway computers and/or edge servers.

External component 900 can include a computer display monitor 920, a keyboard 930, and a computer mouse 934. External component 900 can also include touch screens, virtual keyboards, touch pads, pointing devices, and other human interface devices. Internal component 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method of determining a condition of a filter located within a system, the method comprising:
    determining a first air flow measurement value for a first air flow through the filter;
    determining a first energy consumption value associated with generating the first air flow through the filter;
    determining a first ratio between the first air flow measurement value and the first energy consumption value;
    determining a second air flow measurement value for a second air flow through the filter;
    determining a second energy consumption value associated with generating the second air flow through the filter;
    determining a second ratio between the second air flow measurement value and the second energy consumption value; and
    replacing the filter based on a comparison between the determined first and the determined second ratio.

2. The method of claim 1, wherein the comparison between the determined first and the determined second ratio comprises determining when the second ratio falls below the first ratio.

3. The method of claim 1, wherein the determining of the first air flow measurement value comprises measuring the first air flow using an anemometer device.

4. The method of claim 3, wherein the determining of the second air flow measurement value comprises measuring the second air flow using the anemometer device.

5. The method of claim 1, wherein the determining of the first energy consumption value comprises measuring a first revolutions-per-minute (RPM) value corresponding to a fan that generates the first air flow through the filter.

6. The method of claim 5, wherein the determining of the second energy consumption value comprises measuring a second revolutions-per-minute (RPM) value corresponding to the fan that generates the second air flow through the filter.

7. The method of claim 1, wherein the first ratio value comprises a predetermined threshold value calculated when the filter is first installed within the system.

8. The method of claim 7, wherein the predetermined threshold value is adjusted based on a time difference between the determining of the first ratio and when the second ratio falls below the first ratio.

9. A computer system for determining a condition of a filter located within a system, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
determining a first air flow measurement value for a first air flow through the filter;
determining a first energy consumption value associated with generating the first air flow through the filter;
determining a first ratio between the first air flow measurement value and the first energy consumption value;
determining a second air flow measurement value for a second air flow through the filter;
determining a second energy consumption value associated with generating the second air flow through the filter;
determining a second ratio between the second air flow measurement value and the second energy consumption value; and
replacing the filter based on a comparison between the determined first and the determined second ratio.

10. The system of claim 9, wherein the comparison between the determined first and the determined second ratio comprises determining when the second ratio falls below the first ratio.

11. The system of claim 9, wherein the determining of the first air flow measurement value comprises measuring the first air flow using an anemometer device.

12. The system of claim 11, wherein the determining of the second air flow measurement value comprises measuring the second air flow using the anemometer device.

13. The system of claim 9, wherein the determining of the first energy consumption value comprises measuring a first revolutions-per-minute (RPM) value corresponding to a fan that generates the first air flow through the filter.

14. The system of claim 13, wherein the determining of the second energy consumption value comprises measuring a second revolutions-per-minute (RPM) value corresponding to the fan that generates the second air flow through the filter.

15. The system of claim 9, wherein the first ratio value comprises a predetermined threshold value calculated when the filter is first installed within the system.

16. The system of claim 15, wherein the predetermined threshold value is adjusted based on a time different between the determining of the first ratio and when the second ratio falls below the first ratio.

17. A computer program product for determining a condition of a filter located within a system, comprising:
one or more non-transitory computer-readable storage devices and program instructions stored on at least one of the one or more non-transitory computer-readable storage devices, the program instructions executable by a processor, the program instructions comprising:
determining a first air flow measurement value for a first air flow through the filter;
determining a first energy consumption value associated with generating the first air flow through the filter;
determining a first ratio between the first air flow measurement value and the first energy consumption value;
determining a second air flow measurement value for a second air flow through the filter;
determining a second energy consumption value associated with generating the second air flow through the filter;
determining a second ratio between the second air flow measurement value and the second energy consumption value; and
replacing the filter based on a comparison between the determined first and the determined second ratio.

18. The computer program of claim 17, wherein the comparison between the determined first and the determined second ratio comprises determining when the second ratio falls below the first ratio.

19. The computer program of claim 17, wherein the determining of the first air flow measurement value comprises measuring the first air flow using an anemometer device, and wherein the determining of the second air flow measurement value comprises measuring the second air flow using the anemometer device.

20. The computer program of claim 17, wherein the determining of the first energy consumption value comprises measuring a first revolutions-per-minute (RPM) value corresponding to a fan that generates the first air flow through the filter, and wherein the determining of the second energy consumption value comprises measuring a second revolutions-per-minute (RPM) value corresponding to the fan that generates the second air flow through the filter.

* * * * *